(12) United States Patent
Vojak

(10) Patent No.: US 8,391,604 B2
(45) Date of Patent: Mar. 5, 2013

(54) CAMERA-VISION SYSTEMS, USED IN COLLABORATION WHITEBOARDS, FOR PRE-FORMATTED, REUSABLE, ANNOTATABLE, MOVABLE MENUS AND FORMS

(75) Inventor: William John Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 365 days.

(21) Appl. No.: 12/841,934

(22) Filed: Jul. 22, 2010

(65) Prior Publication Data
US 2012/0020562 A1 Jan. 26, 2012

(51) Int. Cl.
*G06K 9/00* (2006.01)
(52) U.S. Cl. ............ 382/181; 235/462.01; 348/169
(58) Field of Classification Search .......... 382/100, 382/103, 112, 155, 159, 165, 181, 183, 184, 382/190, 195, 199, 206; 235/462.01; 348/169–172
See application file for complete search history.

(56) References Cited

U.S. PATENT DOCUMENTS

| | | | |
|---|---|---|---|
| 6,000,946 A | 12/1999 | Snyders et al. | |
| 6,182,387 B1 | 2/2001 | Duguay | |
| 6,307,542 B1 | 10/2001 | Nagaoka et al. | |
| 6,476,834 B1 | 11/2002 | Doval et al. | |
| 6,507,865 B1 | 1/2003 | Hanson et al. | |
| 6,681,045 B1 | 1/2004 | Lapstun et al. | |
| 6,720,985 B1 | 4/2004 | Silverbrook et al. | |
| 6,724,373 B1 | 4/2004 | O'Neill, Jr. et al. | |
| 6,766,942 B1 | 7/2004 | Silverbrook et al. | |
| 6,832,717 B1 | 12/2004 | Silverbrook et al. | |
| 6,922,779 B1 | 7/2005 | Lapstun et al. | |
| 6,976,220 B1 | 12/2005 | Lapstun et al. | |

(Continued)

FOREIGN PATENT DOCUMENTS

| EP | 1203284 B1 | 5/2002 |
|---|---|---|
| GB | 2352864 A | 2/2001 |

(Continued)

OTHER PUBLICATIONS

Lasome,Caterina and Xiao, Yan,"Large Public Display Boards:A Case Study of an OR Board adn Design Implications," 2001, 1067-5027/01/$5.00, AMIA, Inc., Baltimore, MD.

(Continued)

*Primary Examiner* — Anand Bhatnagar
(74) *Attorney, Agent, or Firm* — Brooks Acordia IP Law, PC; Pejman Yedidsion; David Ripma

(57) ABSTRACT

Systems and devices for, and methods of, image-based processing where a device embodiment comprises: (a) a processor; (b) an addressable memory, the memory comprising a set one or more image references, and where the set of image references comprises a rule of interpretation and a rule of execution; and the processor is configured to: (1) compare captured surface indicia of a sheet with the set of at least one image reference; (2) determine the image reference associated with the surface indicia based on the comparison of the surface indicia and the set of at least one image reference; (3) extract a marking by differencing the surface indicia and the image reference; (4) interpret the extracted marking based on the rule of interpretation associated with the image reference; and (5) invoke the rule of execution based on the rule of interpretation.

13 Claims, 14 Drawing Sheets

U.S. PATENT DOCUMENTS

| | | | |
|---|---|---|---|
| 6,995,859 B1 | 2/2006 | Silverbrook et al. | |
| 7,055,739 B1 | 6/2006 | Lapstun et al. | |
| 7,106,888 B1 | 9/2006 | Silverbrook et al. | |
| 7,121,469 B2 * | 10/2006 | Dorai et al. | 235/470 |
| 7,123,239 B1 | 10/2006 | Lapstun et al. | |
| 7,293,240 B2 | 11/2007 | Lapstun et al. | |
| 7,467,185 B2 | 12/2008 | Lapstun et al. | |
| 7,743,347 B2 * | 6/2010 | Graham et al. | 715/863 |
| 8,238,666 B2 * | 8/2012 | Besley et al. | 382/203 |
| 2003/0105817 A1 | 6/2003 | Lapstun et al. | |
| 2003/0105818 A1 | 6/2003 | Lapstun et al. | |
| 2003/0110220 A1 | 6/2003 | Lapstun et al. | |
| 2003/0137496 A1 | 7/2003 | Stevens et al. | |
| 2005/0229107 A1 | 10/2005 | Hull et al. | |
| 2007/0139399 A1 | 6/2007 | Cook | |
| 2008/0143691 A1 | 6/2008 | Cook | |
| 2009/0283601 A1 * | 11/2009 | Schultze et al. | 235/470 |
| 2010/0124362 A1 * | 5/2010 | Wu et al. | 382/112 |
| 2011/0026762 A1 * | 2/2011 | Inazumi | 382/100 |

FOREIGN PATENT DOCUMENTS

| | | |
|---|---|---|
| WO | WO-01/22246 A1 | 3/2001 |
| WO | WO-2007/062187 A2 | 5/2007 |
| WO | WO-2007/062187 A3 | 5/2007 |

OTHER PUBLICATIONS

Tan et al."The Best of Two Worlds:Merging Virtual and Real for Face to Face Collaboration,"Dec. 4, 2000-Dec. 6, 2000,http://research.microsoft.com/en-us/um/people/desney/publications/cscw2000-twoworlds.pdf.

Rekimoto, Jun,"A Multiple Device Approach for Supporting Whiteboard-based Interactions," Apr. 23, 1998,http://www/slideshare.net/rekimoto/chi98-a-multiple-device-approach-for-supporting-whiteboardbased-interactions. Japan.

Smith, Long, Lung, and Anwar, "PaperSpace:A System for Managing Digital and Paper Documents," CHI 2006, Apr. 22-27, 2006, ACM 1-59593-298-04/06/0004, Montreal, Quebec, Canada.

Bernard, Francois,"The Magic Table:Computer-Vision Based Augmentation of a Whiteboard for Creative Meetings," IEEE International Conference on Computer Vision, Oct. 12, 2003.

Moran, Chiu and Melle,"Pen-Based Interaction Techniques for Organizing Material on an Electronic Whiteboard,"UIST 1997 Symposium,1997, Palo Alto, California.

* cited by examiner

CAMERA-VISION SYSTEMS, USED IN COLLABORATION WHITEBOARDS, FOR PRE-FORMATTED, REUSABLE, ANNOTATABLE, MOVABLE MENUS AND FORMS

TECHNICAL FIELD

Embodiments pertain to camera-vision devices, systems, and methods, used in collaboration whiteboards, for pre-formatted, reusable, annotatable, movable menus and forms.

BACKGROUND

Typically, a whiteboard collaboration environment uses a camera, image capture, and/or optical character recognition to tag specific items that are under discussion for action items or for future reference, to select drawing controls, and/or to enter data into a collaboration system.

SUMMARY

Embodiments provide the functionality for inputting information into a camera-vision based collaboration environment. Embodiments pertain to systems and devices for, and methods of, an image-based computer processor configured to capture surface indicia, determine an image reference associated with it, extract a set of one or more markings based on the image reference, and invoke a rule of execution based on the rule of interpretation associated with the image reference.

Device embodiments may comprise a processor; an addressable memory, the memory comprising a set of one or more image references, and where the set of image references comprises a rule of interpretation and a rule of execution; and where the processor may be configured to: (a) compare captured surface indicia of a sheet with the set of at least one image reference; (b) determine the image reference associated with the surface indicia based on the comparison of the surface indicia and the set of at least one image reference; (c) extract a marking by differencing the surface indicia and the image reference; (d) interpret the extracted marking based on the rule of interpretation associated with the image reference; and (e) invoke the rule of execution based on the rule of interpretation. Some embodiments may be further configured to receive data from at least one of a camera, video capturing device, digital video recorder, scanning camera, webcam, and motion capture device. Some embodiments may compare the surface indicia with at least one image reference via a visual process and by using a detection method further comprising at least one of edge detection, geometric shape detection, and bar code detection. The extraction of the markings may be implemented via at least one of: visual differencing, pattern recognition, optical mark recognition, and optical character recognition. In an embodiment the processor may be further configured to determine a marking on at least a portion of the surface indicia, indicative of immediate invocation of the rule of execution based on the rule of interpretation.

Method embodiments may comprise: (a) capturing a surface indicia of a sheet; (b) comparing the surface indicia with a set of at least one image reference, where the image reference comprises a set of rules, and where each set of rules comprises a set of at least one rule of interpretation and a set of at least one rule of execution; (c) determining the image reference associated with the surface indicia based on the comparison of the captured surface indicia and the set of at least one image reference; (d) extracting a marking by differencing the surface indicia and the image reference; (e) interpreting the extracted marking based on the set of rules according to the image reference; and (f) invoking the rule of execution based on the rule of interpretation.

System embodiments may comprise: (a) a set of one or more predefined indicia; (b) a surface configured to receive markings. The system also comprising an image capture device, configured to capture an image of a portion of the sheet element. The system further comprising (a) an image capture device configured to capture surface indicia of a sheet and (b) an image-based computer processing device comprising: a processor and addressable memory, the memory comprising a set of one or more image references, where each member of the set of image references comprises a rule of interpretation and a rule of execution; and the processor may be configured to: (1) compare the surface indicia with the set of at least one image reference; (2) determine the image reference associated with the surface indicia based on the comparison of the surface indicia and the set of at least one image reference; (3) extract a marking by differencing the surface indicia and the image reference; (4) interpret the extracted marking based on the rule of interpretation associated with the image reference; and (5) invoke the rule of execution based on the rule of interpretation. Some embodiments of the sheet element may further comprise flexible, electro-static, and/or nontranslucent material.

BRIEF DESCRIPTION OF THE DRAWINGS

Embodiments are illustrated by way of example and not limitation in the figures of the accompanying drawings, and in which.

DETAILED DESCRIPTION

Figure 1:
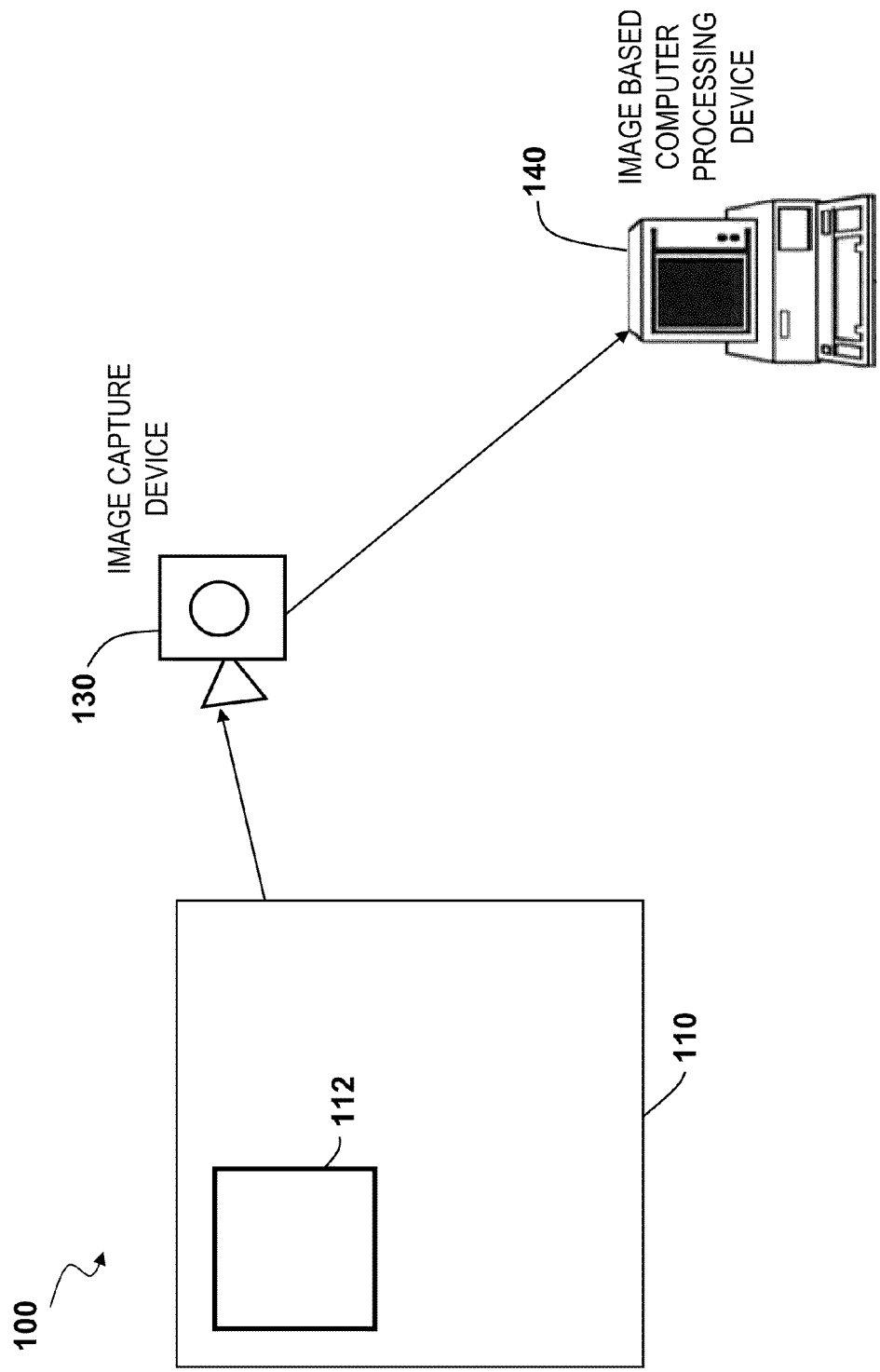
FIG. 1 is a functional block diagram depicting an exemplary image-based collaboration system environment.

FIG. 1 is a functional block diagram depicting an exemplary image-based collaboration system environment 100. A system embodiment is depicted in FIG. 1 as comprising a whiteboard 110 that contains a set of one or more sheets 112, an image capture device 130, and an image-based computer processing device 140. Embodiments of the image-based collaboration system 100 may be executed in real time or near real time, and the information may be at least one of received, read and captured from the sheet 112 or a portion thereof. An image capture device 130 is depicted as capturing an image of a portion of the collaboration whiteboard 110, e.g., a sheet 112 containing a set of one or more predefined indicia. The image capture device 130 may be at least one of a camera, video capturing device, digital video recorder, scanning camera, webcam, and motion capture device. An image-based computer processing device 140 may be configured to compare the captured surface indicia with a set of at least one image reference and determine the image reference associated with the surface indicia. By comparing the surface indicia with the set of at least one image reference, and then extracting the difference between them, a set of markings may be identified. Once a marking has been extracted from the surface indicia it may be interpreted based on the image reference. The image reference may additionally contain a rule of execution or a set of instructions associated with the interpretation.

Figure 2:
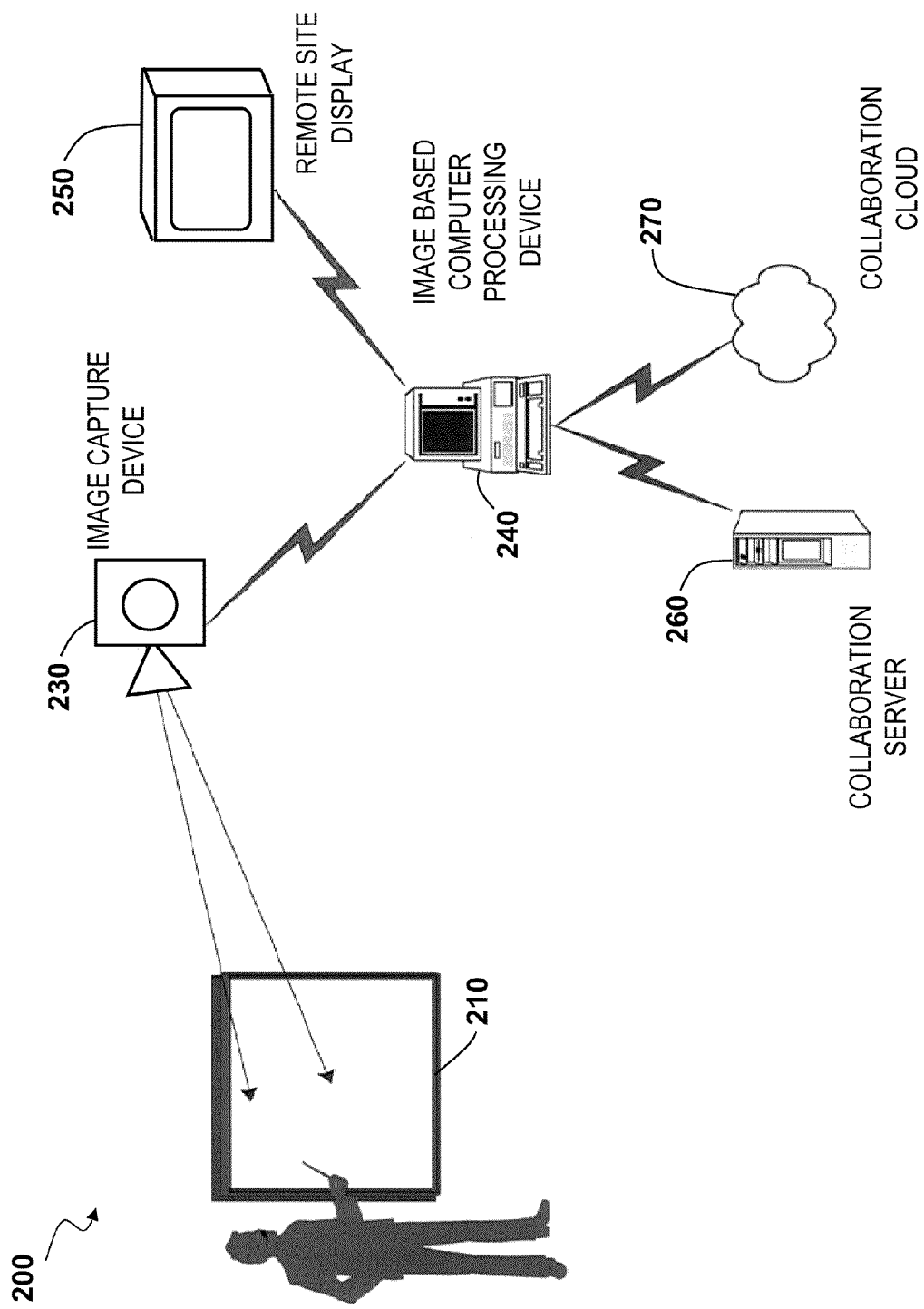
FIG. 2 is a functional block diagram depicting an exemplary image-based collaboration system environment that also optionally includes a collaboration server, a display at a remote site, and one or more offsite nodes and/or data storage.

FIG. 2 is a functional block diagram depicting an exemplary image-based collaboration system environment 200 that comprises a whiteboard 210, an image capture device 230, an image-based computer processing device 240, a display at a remote site 250, e.g., LCD display, a collaboration server 260, and one or more offsite nodes and/or data storage 270, e.g., collaboration cloud, that may be used for maintaining an associated image reference. In this embodiment the whiteboard 210 may be monitored by an image capture device 230, e.g., camera-vision system, that is collaborating with an image-based computer processing device 240, e.g., collaboration computer. The image references may be stored in any one of the collaboration computer 240, collaboration server 260, collaboration cloud 270, or in some combination. Optionally, the resulting output may be displayed on a remote site display 250.

Figure 3:
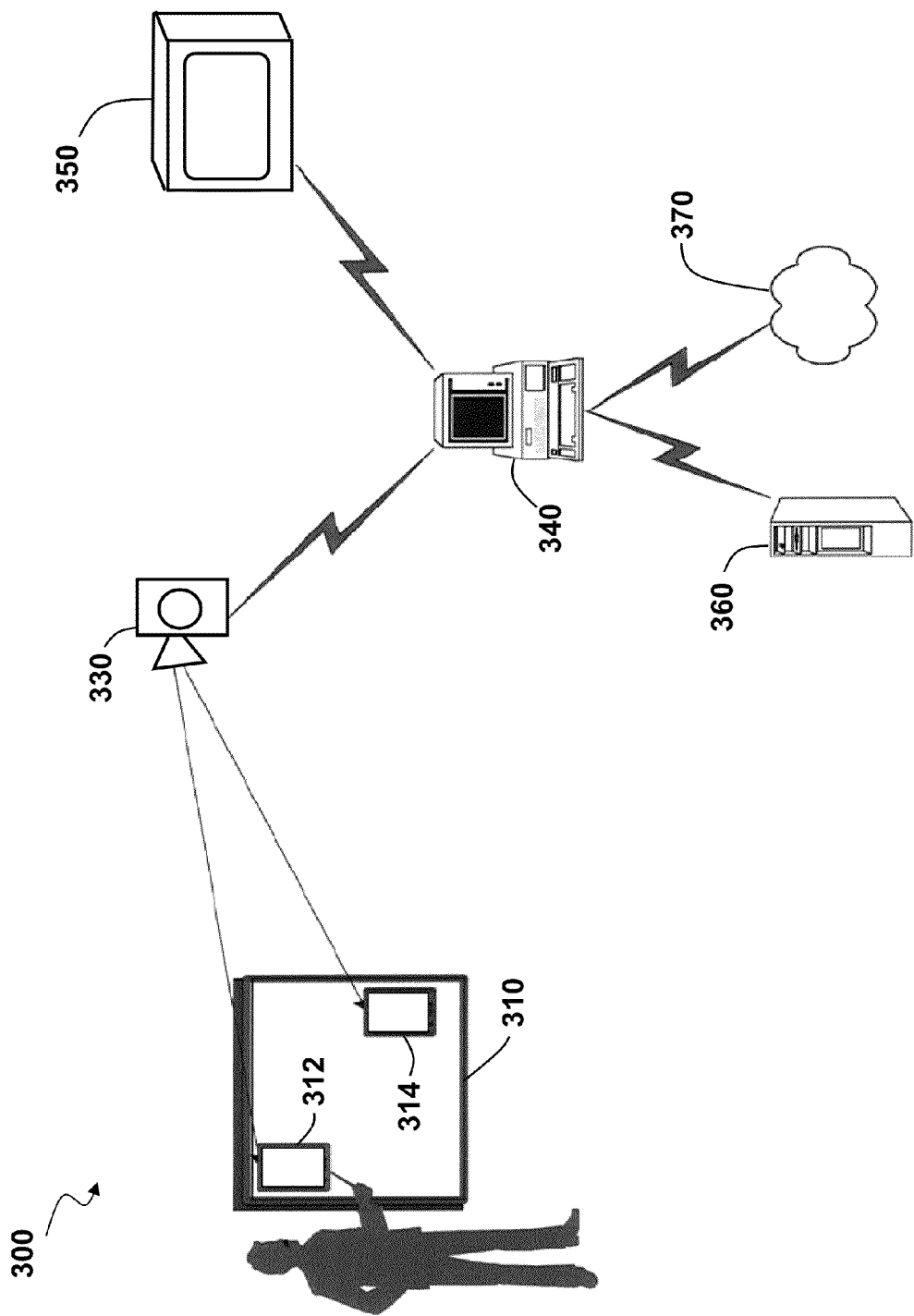
FIG. 3 is a functional block diagram depicting an exemplary image-based collaboration system environment, where the whiteboard contains a plurality of sheets.

FIG. 3 is a functional block diagram depicting an exemplary image-based collaboration system environment 300 that comprises a whiteboard 310 that contains a set of one or more sheets 312, 314, an image capture device 330, an image-based computer processing device 340, a display at a remote site 350, e.g., LCD display, a collaboration server 360, and one or more offsite nodes and/or data storage 370, e.g., collaboration cloud that may be used for maintaining an associated image reference. In this exemplary embodiment, the whiteboard 310 is depicted as being monitored by an image capture device 330 that may be controlled by the image-based computer processing device 340, e.g., a collaboration computer. The image references may be stored in any one of the collaboration computer 340, a collaboration server 360, a collaboration cloud 370, i.e., distributed network storage, or in some combination thereof. Optionally, the resulting output may be displayed on a remote site display 350. The plurality of sheets 312, 314 may contain a set of one or more predefined indicia and a surface configured to receive markings. A user may dispose one or more sheets within or about the collaboration environment that, in this example, includes a whiteboard 310. The image capture device 330 may detect changes to the disposition and/or orientation of one or more sheets 312, 314 on the whiteboard 310, and capture the surface indicia of the sheet. The predefined indicia may be identified by comparing the surface indicia, e.g., a unique identifying number or symbol with a set of at least one image reference.

Figure 4:
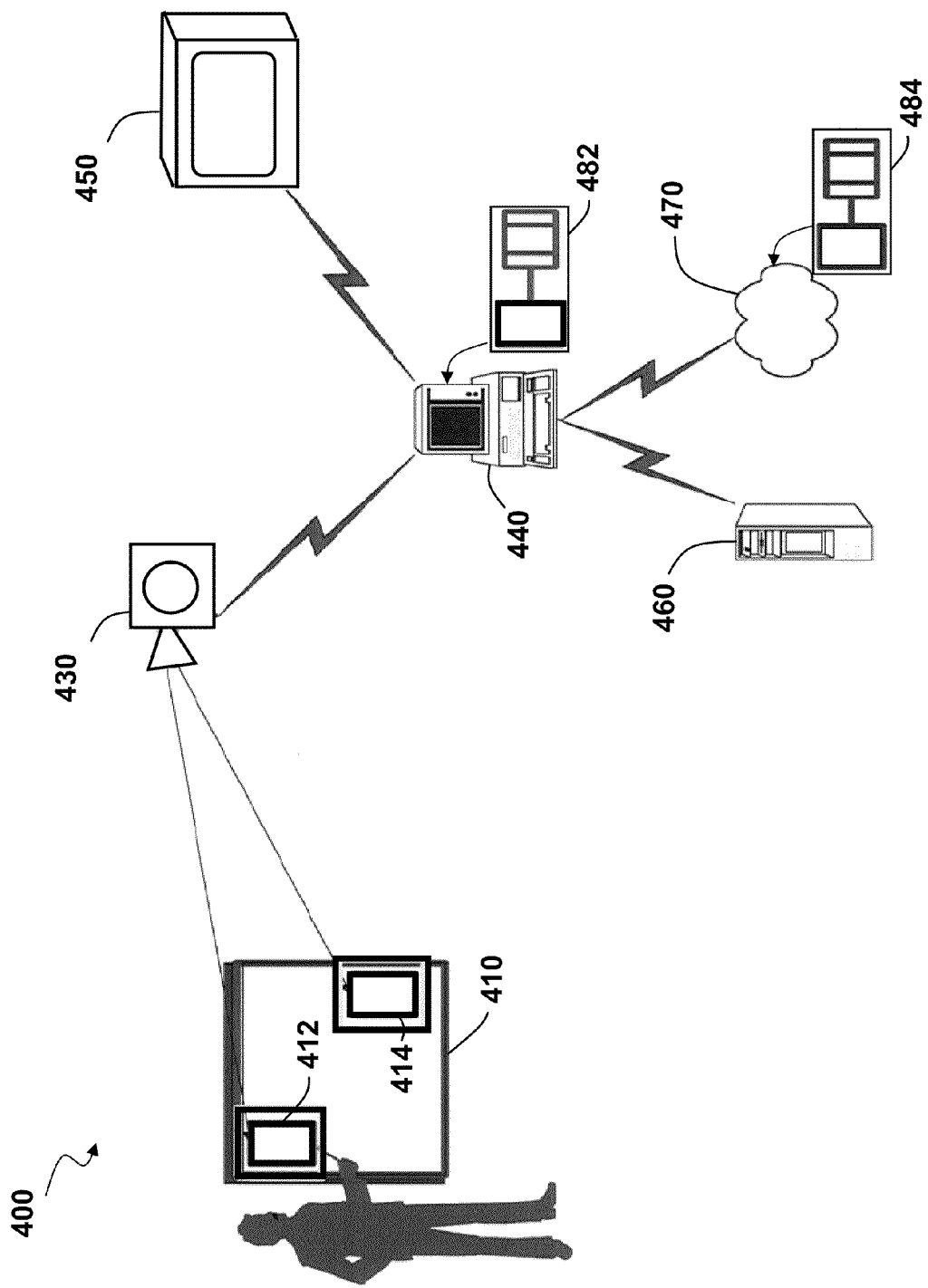
FIG. 4 is a functional block diagram depicting an exemplary image-based collaboration system environment, where the system has identified the input form or menu locations on the whiteboard as hot-zones.

FIG. 4 is a functional block diagram depicting an exemplary image-based collaboration system environment 400 that comprises a whiteboard 410 that contains a set of one or more sheets 412, 414, an image capture device 430, an image-based computer processing device 440, a display at a remote site 450, e.g., LCD display, a collaboration server 460, and one or more offsite nodes and/or data storage 470, e.g., collaboration cloud that may be used for maintaining an associated image reference. In one embodiment the whiteboard 410 is being monitored by an image capture device 430 that may be controlled by the image-based computer processing device 440, e.g., collaboration computer. The image references may be stored in any one of the collaboration computer 440, a collaboration server 460, a collaboration cloud 470, or in some combination thereof. The whiteboard 410 may contain a plurality of sheets 412, 414, e.g. two input forms or menus, containing a set of one or more predefined indicia and a surface configured to receive markings. The image capture device 430 may detect the changes to the whiteboard 410 and in turn capture the surface indicia of the sheet. The predefined indicia may be identified by comparing the surface indicia, e.g., a unique identifying number or symbol with a set of at least one image reference. The image reference 482 associated with sheet 412 may be determined and the interpretation and/or execution rules are optionally loaded into the memory of the collaboration computer 440. In this embodiment, the interpretation and/or execution rules 484 associated with sheet 414 may be loaded into the memory of the collaboration cloud 470. The system is depicted as having identified the input form or menu locations on the whiteboard as hot-zones. It may monitor those hot-zones for any activity, i.e., changes in markings on the identified sheets. Optionally, the system may determine if a de-skew and/or rotation factor may be required to enhance the interpretation of the surface indicia, e.g., the input form or menu, by the system. If so, the system may attach de-skew and/or rotation information to that hot-zone so that all future image capturing of that section may be properly de-skewed and/or rotated before analysis of the content.

Figure 5:
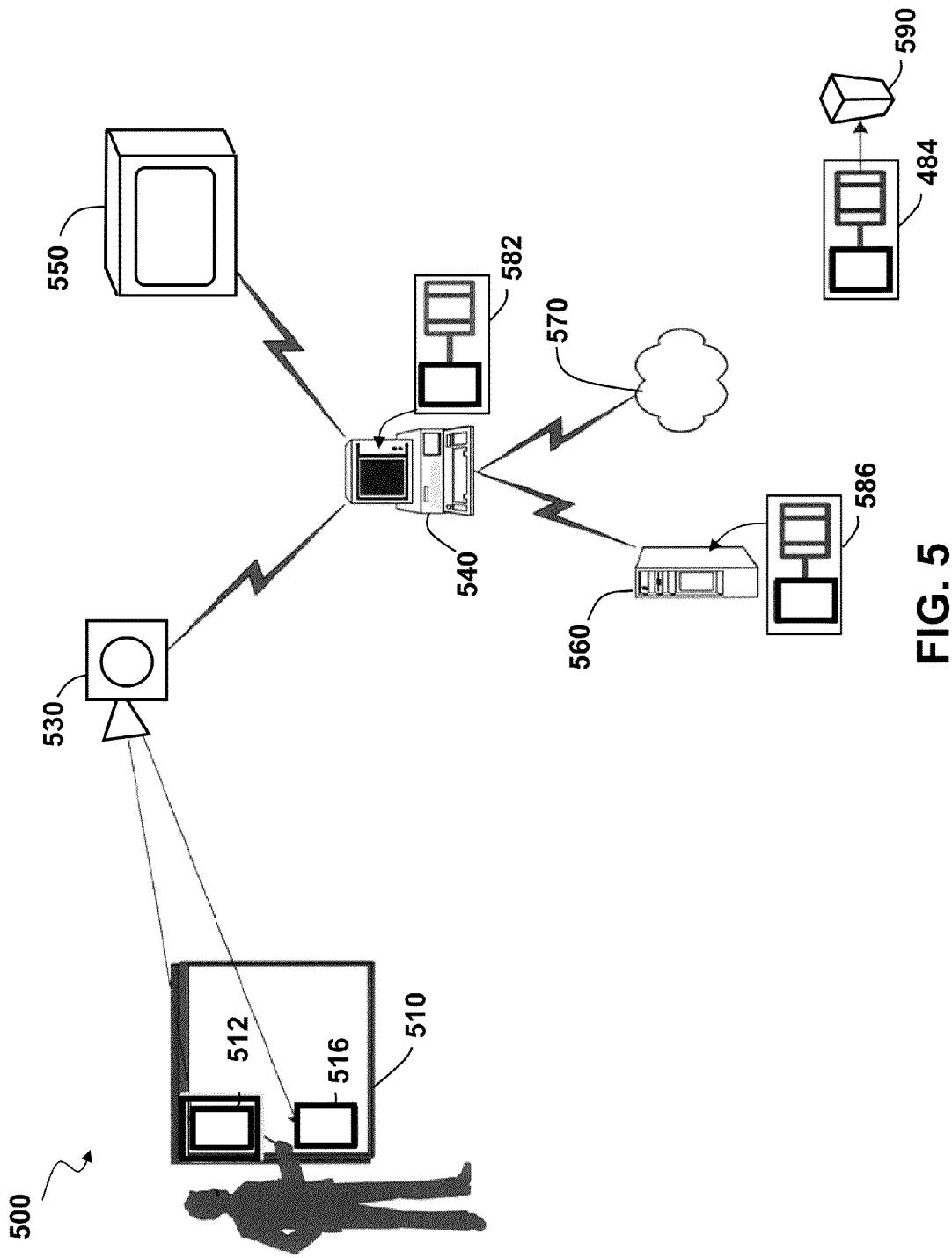
FIG. 5 is a functional block diagram depicting an exemplary image-based collaboration system environment, where one of the sheets has been either relocated or removed and replaced with a new one.

FIG. 5 is a functional block diagram depicting an exemplary image-based collaboration system environment 500 as in FIG. 4, that comprises a whiteboard 510 that contains a set of one or more sheets 512, 516, an image capture device 530, an image-based computer processing device 540, a display at a remote site 550, e.g., LCD display, a collaboration server 560, and one or more offsite nodes and/or data storage 570, e.g., collaboration cloud that may be used for maintaining an associated image reference. In FIG. 5, the sheet 414 on the bottom right corner of FIG. 4 is depicted as being removed and replaced with a new sheet 516 on the bottom left corner. The image reference 582 associated with sheet 512 may be determined and the interpretation and/or execution rules are optionally loaded into the memory of the collaboration computer 540. The removed sheet 414 and the spatial location of that collaboration environment is given a provisional deletion status. The image reference and the interpretation and/or execution rules 484 associated with the removed sheet 414 may be provisionally deleted 590 from the current workspace. Optionally, the interpretation and/or execution rules 484 may be retained in cache. The image capture device 530 may detect the changes to the whiteboard 510 and in turn capture the surface indicia of the new sheet 516. The predefined indicia may be identified by comparing the surface indicia, e.g., a unique identifying number or symbol with a set of at least one image reference. The image reference 586 associated with the new sheet 516 may be determined and the interpretation and/or execution rules are optionally loaded into the memory of the collaboration server 560. In this example, a sheet may also be relocated from one area of the whiteboard 510 to another and the image capture device 530 may then detect the changes to the whiteboard 510 and in turn capture the surface indicia of the relocated sheet.

Figure 6:
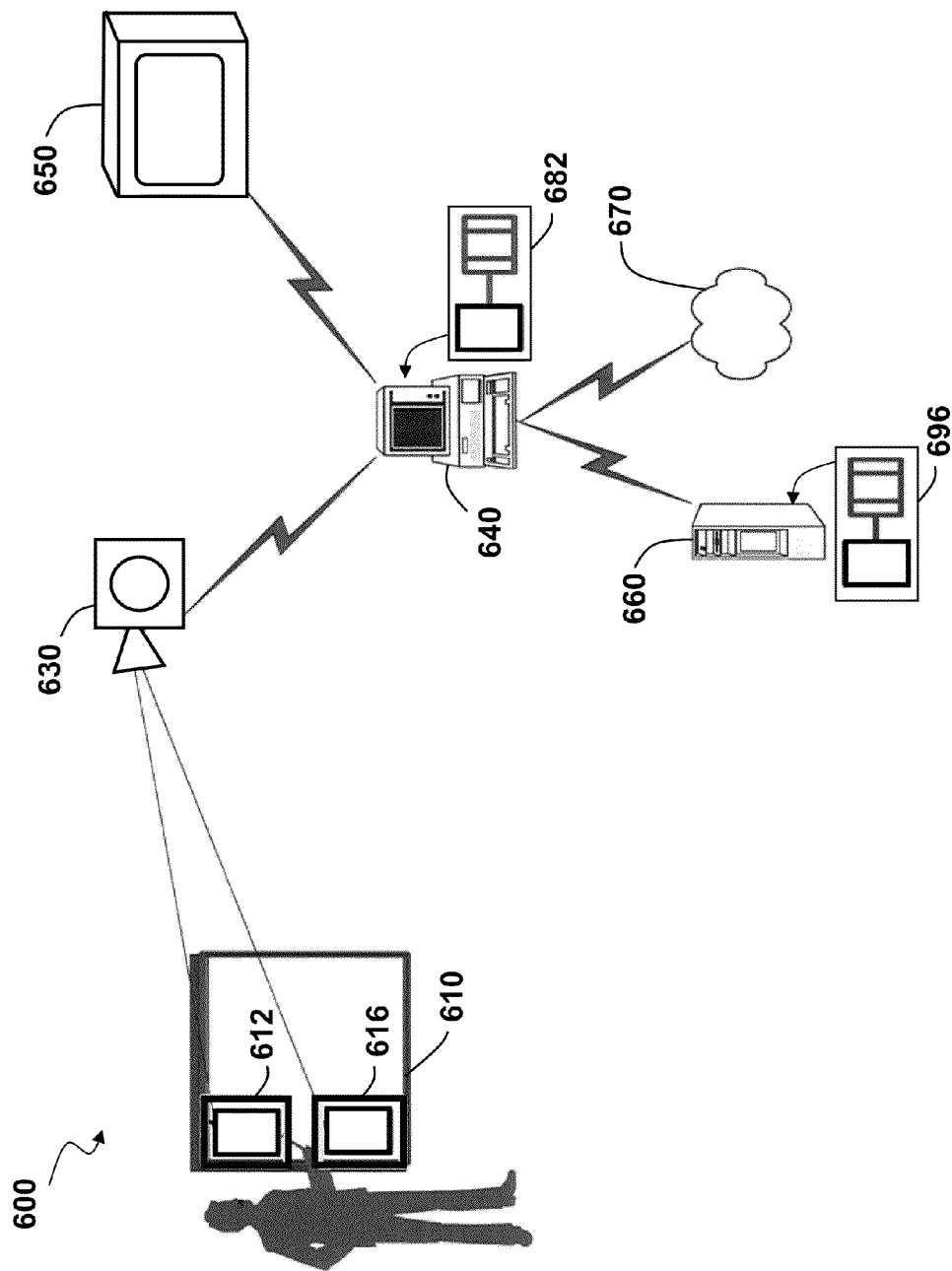
FIG. 6 further shows the embodiment as in FIG. 5 where a new hot-zone is identified and established for monitoring.

FIG. 6 is a functional block diagram depicting an exemplary image-based collaboration system environment 600, that comprises a whiteboard 610 that contains a set of one or more sheets 612, 616, an image capture device 630, an image-based computer processing device 640, a display at a remote site 650, e.g., LCD display, a collaboration server 660, and one or more offsite nodes and/or data storage 670, e.g., collaboration cloud that may be used for maintaining an associated image reference. New surface indicia 616 may then be placed on the whiteboard and further identified. FIG. 6 further shows the embodiment of FIG. 5 where a new hot-zone may be identified and established for monitoring. The image reference 682 associated with sheet 612 and the interpretation and/or execution rules, as determined previously, are optionally loaded into the memory of the collaboration computer 640. The system is depicted as having identified the input form or menu locations on the whiteboard as hot-zones. It may now monitor those hot-zones for any activity, i.e., changes in markings on the identified sheets 612 and 616. The interpretation and/or execution rules 696 for sheet 616 are determined and the extracted marking may be interpreted based on the rule of interpretation and the associated rule of execution is optionally invoked.

Figure 7:
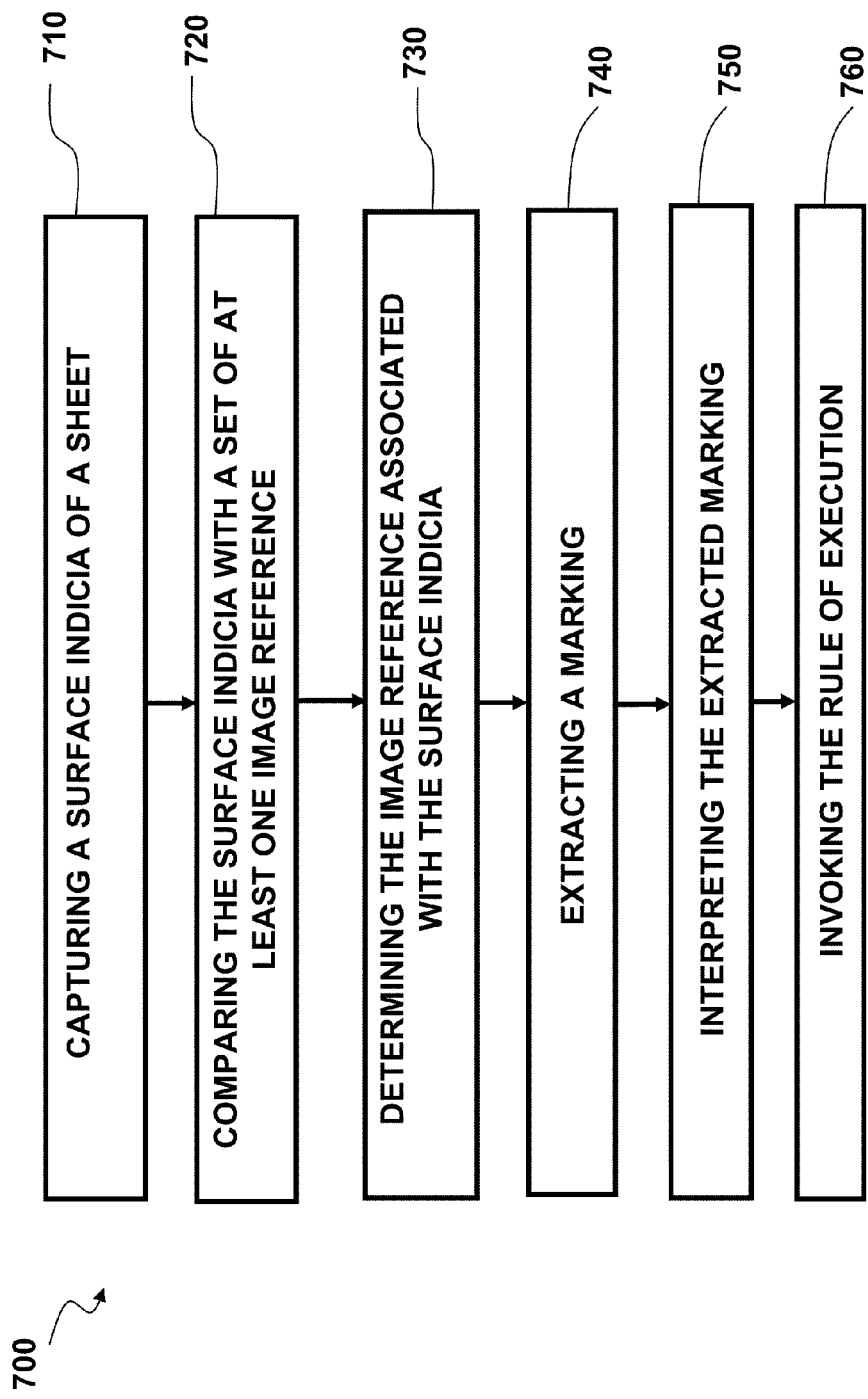
FIG. 7 is a flowchart depicting an exemplary functional block diagram of an image-based collaboration system environment.

FIG. 7 is a flowchart depicting an exemplary functional block diagram of an image-based collaboration system environment 700. The system may capture a surface indicia of a sheet by way of an image capture device (step 710). The surface indicia may then be compared with a set of at least one image reference (step 720). The image reference associated with the surface indicia may be determined based on the comparison of the surface indicia and the set of at least one image reference (step 730). In the next step, a marking may be extracted from the surface indicia based on the comparison of the surface indicia and the set of at least one image reference (step 740). The extracted marking may then be interpreted based on the rule of interpretation associated with the image reference (step 750). The rule of execution may then be invoked based on the rule of interpretation (step 760).

In an embodiment the sheet element may be flexible vinyl, Mylar®, poly sheets, or other similar materials. The physical attributes of the sheet may be nontranslucent and may include a set of light colors, e.g., white. Light colors would allow the computer vision system to locate the menu on the whiteboard easier, e.g., by comparing chromatic differences. The sheet may optionally have a natural electro-static capability so that it may be attached and removed from the surface of the whiteboard using just the electro-static charge. The surface may be compatible with the use of various style markers and erasers, for example, dry-erase, glossy, water-proof, and washable. The sheet may optionally be made out of a thick material to resist bubbling and wrinkling.

Figure 8:
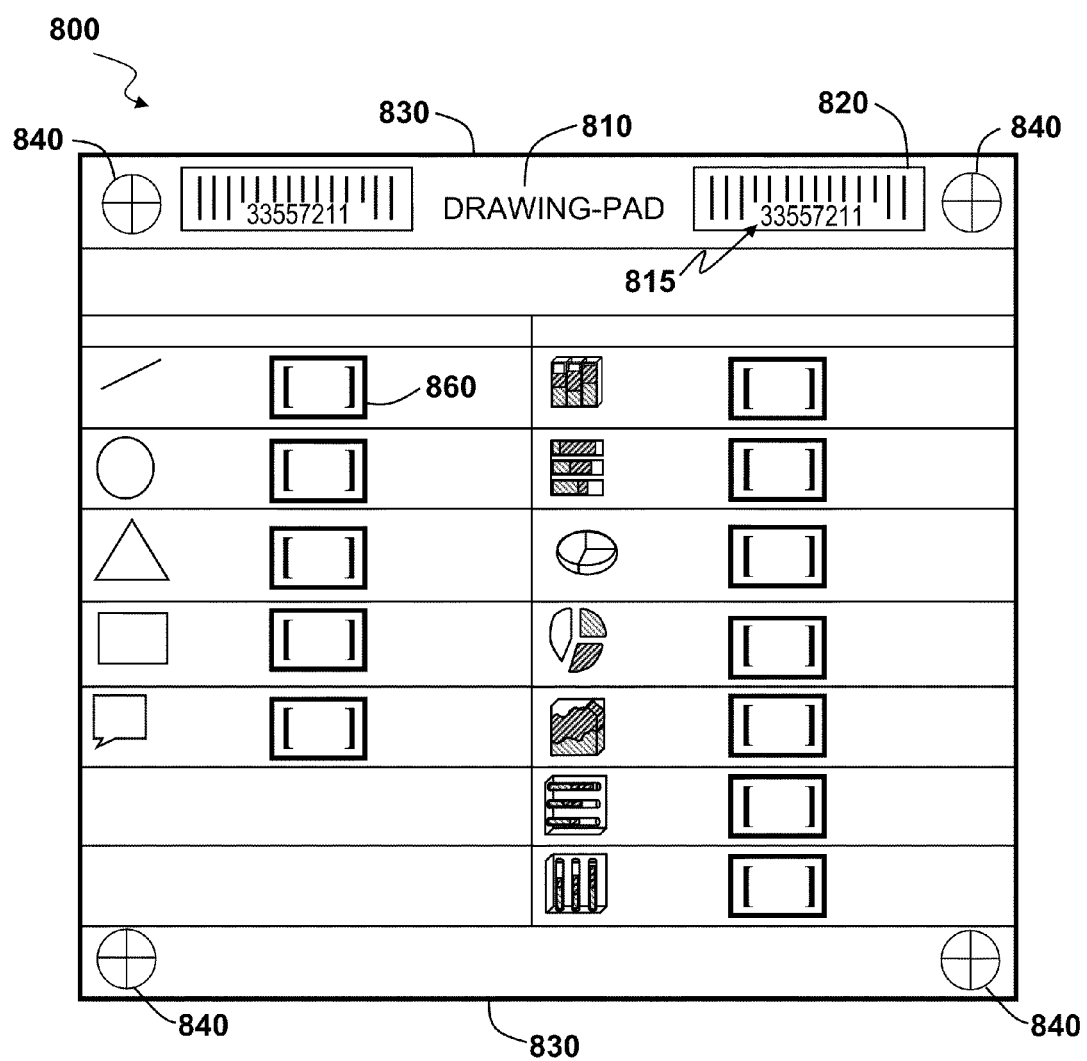
FIG. 8 depicts an exemplary embodiment of a surface indicia of a pre-printed sheet that shows the example input forms and menus designated as hot-zones.

FIG. 8 depicts an exemplary embodiment of a surface indicia of a pre-printed sheet 800. The sheet 800 may have a unique identifying symbol, e.g., any one of, name 810, identification number 815, barcode 820, or in some combination printed on the sheet. The portion of the surface indicia containing the aforementioned objects may be readable by the computer-vision system, and used to identify the image reference associated with the sheet. Optionally, highlighting color(s) may also be used in conjunction with the above methods to add to the ability of the system to locate, identify and validate the sheets. In this embodiment, the sheet may have a combination of identifying marks 810, 815, 820, boundary markings 840, and/or heavy border lines 830 to allow the computer-vision system to easily determine the orientation and boundaries of the image reference. Thus the system may de-skew and/or rotate to normalize the view of the surface indicia as needed based on these objects. Hot-zones 860 within the sheet 800 may be identified where markings may be received and captured from the surface indicia of the sheet 800.

Figure 9:
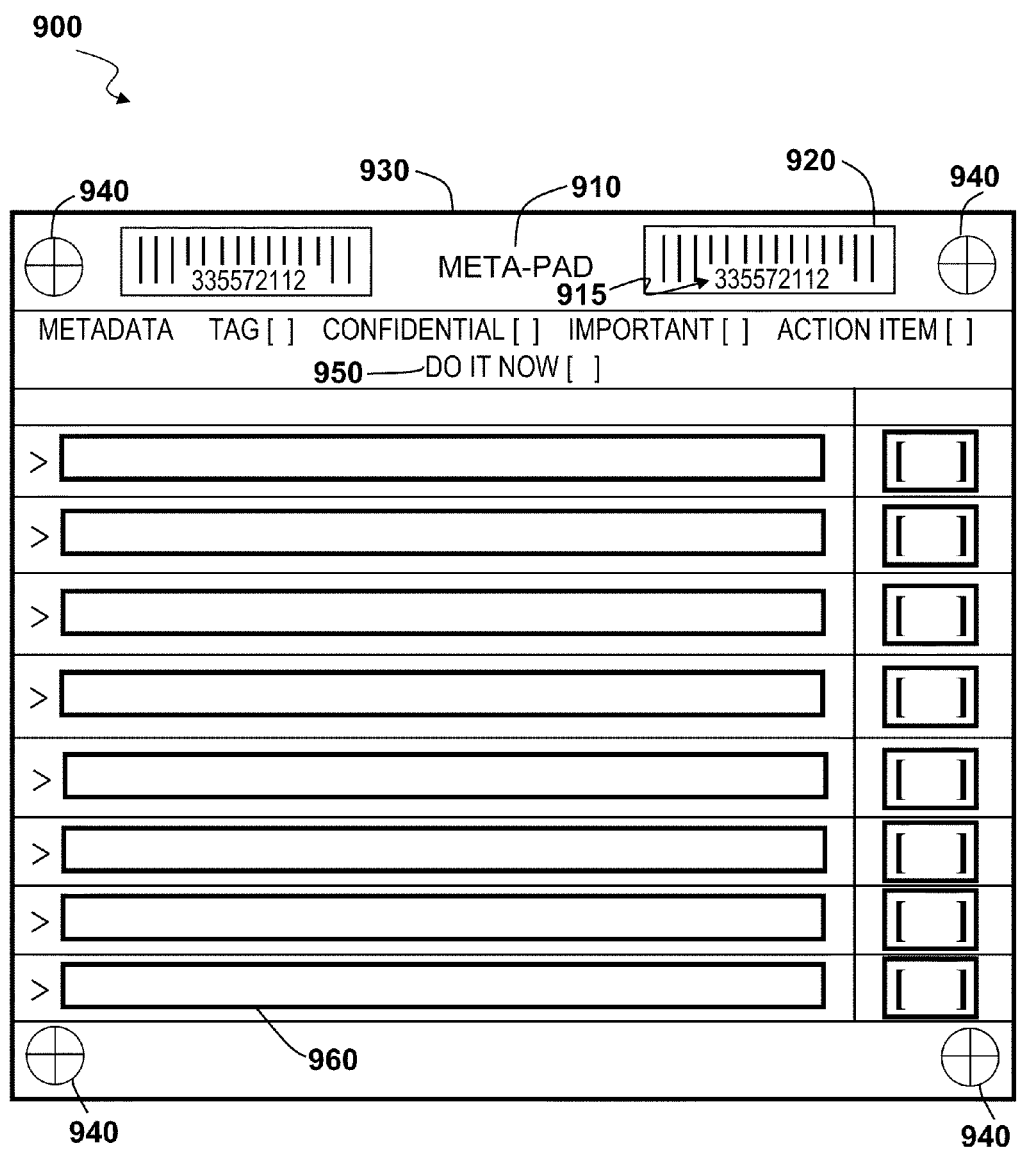
FIG. 9 depicts an exemplary embodiment of a surface indicia of a pre-printed sheet.

FIG. 9 depicts another embodiment of a surface indicia of a pre-printed sheet 900. The sheet 900 may have a unique identifying symbol, e.g., one of at least a set of name 910, identification number 915, barcode 920, or in some combination printed on it. The portion of the surface indicia containing the aforementioned objects may be readable by the computer-vision system, and used to identify the image reference associated with the sheet to the system. In this embodiment, the sheet may have a combination of identifying marks 910, 915, 920, and/or boundary markings 940 and/or heavy border lines 930 to allow the computer-vision system to determine the orientation and boundaries of the image reference. The hot-zones 960 on the surface indicia of the sheet 900 may be marked at any time.

In an embodiment, the sheet may have a "do it now" object 950, where the input forms or menus may require complex or multiple user changes before the inputs or changes are ready to be processed. These input forms or menus may have a "do it now" object 950 as an indicator to the system signifying that the data is ready for processing. If the user has marked the "do it now" object 950, the image based computer processing device identifies the markings and determines the associated reference. In certain embodiments, once the processing of the user inputs are completed, the system may then provide feedback to the user that the data has been processed, e.g., an audio beep. In some "do it now" embodiments, hot-zones 960 may be identified and markings may be received and captured from the surface indicia of the sheet 900. In an embodiment, the "do it now" action may be implemented so that upon receiving the feedback from the system, e.g., an audio beep that indicates or announces that the data has been processed, the user resets the "do it now" button by erasing the mark from the input forms or menu or by removing the sheet and replacing it or some other reset functionality. The system may ignore any further changes to the hot-zone 960 until the "do it now button" is once again set by the user. In this example, the changes may be processed at this point. In other embodiments, the "do it now" action is depicted such that upon receiving the feedback from the system, e.g., an audio beep that indicate or announces that the data has been processed and thereafter, the user may take no further action to reset the "do it now" functionality. The system may ignore any further changes to the hot-zone 960 until the "do it now" button is first cleared, and then reset by the user. At that point the changes may be processed similarly to the first time the "do it now" object 950 was marked.

While each surface indicia may be designated a hot-zone 960 and monitored for changes, the image references themselves may define actual areas within the sheet 900. Where changes are made to the content, it may initiate some action or activity, or indicate data to be entered into the system. For example, in FIG. 8 and FIG. 9, the sample sheets are designated as having at least one "hot-zone" 860, 960. Within each captured image, which may be a portion of the collaboration whiteboard, specific areas of the sheet are monitored for changes which may trigger the action or activity, or indicate data to be entered into the system.

Figure 10:
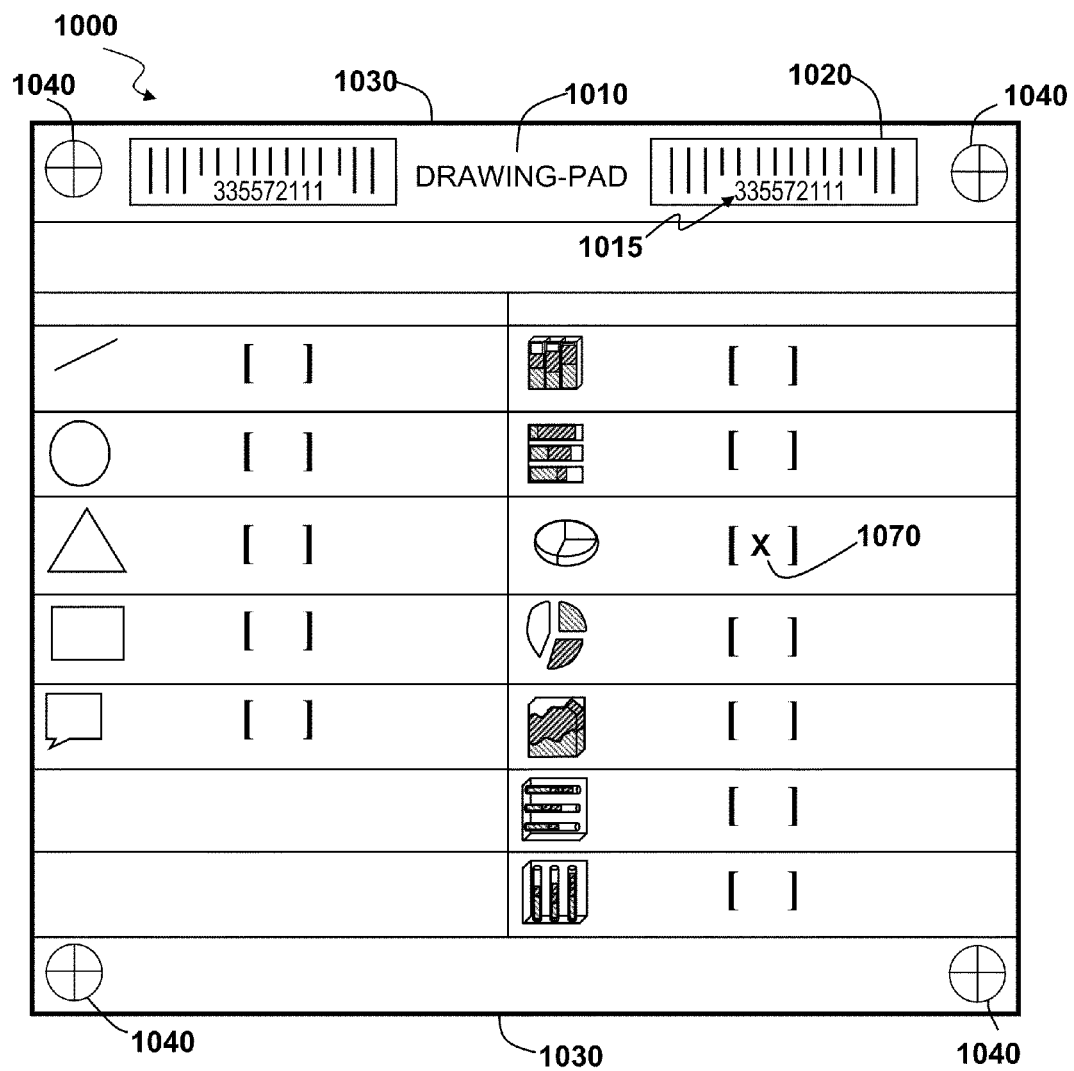
FIG. 10 depicts an exemplary embodiment of a surface indicia of a pre-printed sheet.

FIG. 10 depicts an exemplary embodiment of a surface indicia of a pre-printed sheet 1000, as in FIG. 8. This exemplary sheet contains menu options with the specialized purpose of assisting in creating a drawing, graph, chart, etc. As before, the sheet 1000 may have a unique identifying symbol printed on it, e.g., one of at least a set of name 1010, identification number 1015, barcode 1020, or in some combination, printed on the sheet. The portion of the surface indicia containing the aforementioned objects may be readable by the computer-vision system, and used to identify the image reference associated with the sheet. Optionally, one or more highlighting colors may also be used in conjunction with the above methods, in order to enhance the ability of the system to locate, identify and validate them. In this embodiment, the sheet may have a combination of identifying marks 1010, 1015, 1020, and/or boundary markings 1040 and/or heavy border lines 1030 to allow the computer-vision system to easily determine the orientation and boundaries of the image reference. Thus the system may de-skew and/or rotate to normalize the view of the surface indicia, as needed based on these objects. Markings 1070 received from the hot-zone area may be captured from the surface indicia of the sheet and extracted.

Figure 11:
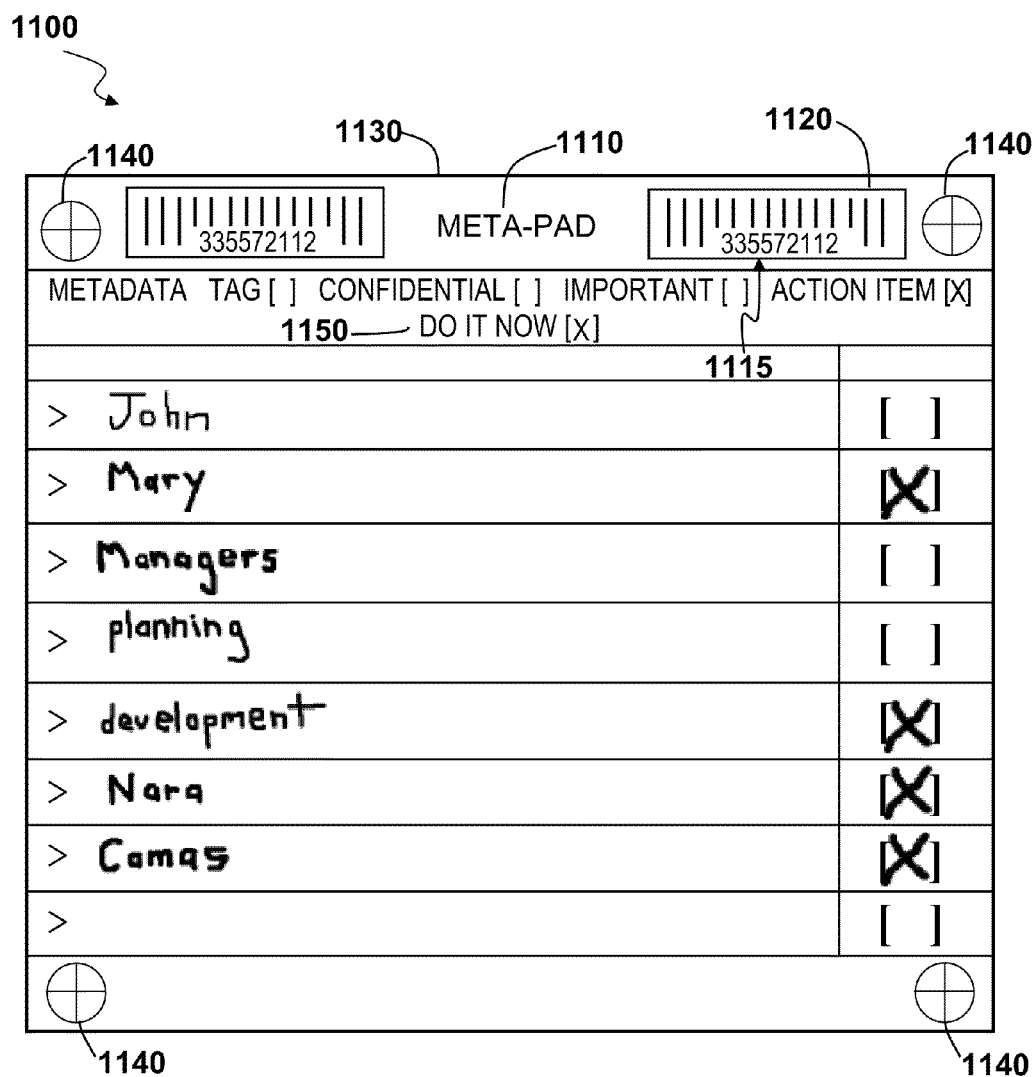
FIG. 11 depicts an exemplary embodiment of a surface indicia of a pre-printed sheet with markings.

FIG. 11 depicts an exemplary embodiment of a surface indicia of a pre-printed sheet 1100 with markings. This exemplary sheet 1100 may also have one of at least a set of unique identifying symbols, e.g., one of at least a set of name 1110, identification number 1115, barcode 1120, or in some combination printed on it. The portion of the surface indicia containing the aforementioned objects may be readable by the computer-vision system that identifies the image reference associated with the sheet. The sheet may have a combination of identifying marks 1110, 1115, 1120, and/or boundary markings 1140 and/or heavy border lines 1130 to allow the computer-vision system to easily determine the orientation and boundaries of the image reference. Optionally, the sheet may have a "do it now" object 1150 where some input forms or menus may require complex or multiple user changes before it may be ready to be processed. This particular exemplary sheet contains menu options with the specialized purpose of assisting in creating and entering user defined meta-data or tags into the system. Some embodiments may apply optical character recognition (OCR) processing. In some embodiments, the system may include handwritten-text-to-OCR processing to convert the received meta-data to binary text. In another embodiment, the system may detect the image boundaries around each received meta-data entry, and converts the handwriting into a small bitmap. That bitmap may then be used as a tag that is associated with the current set of at least one of action, activity, time-stamp, and document.

Figure 12:
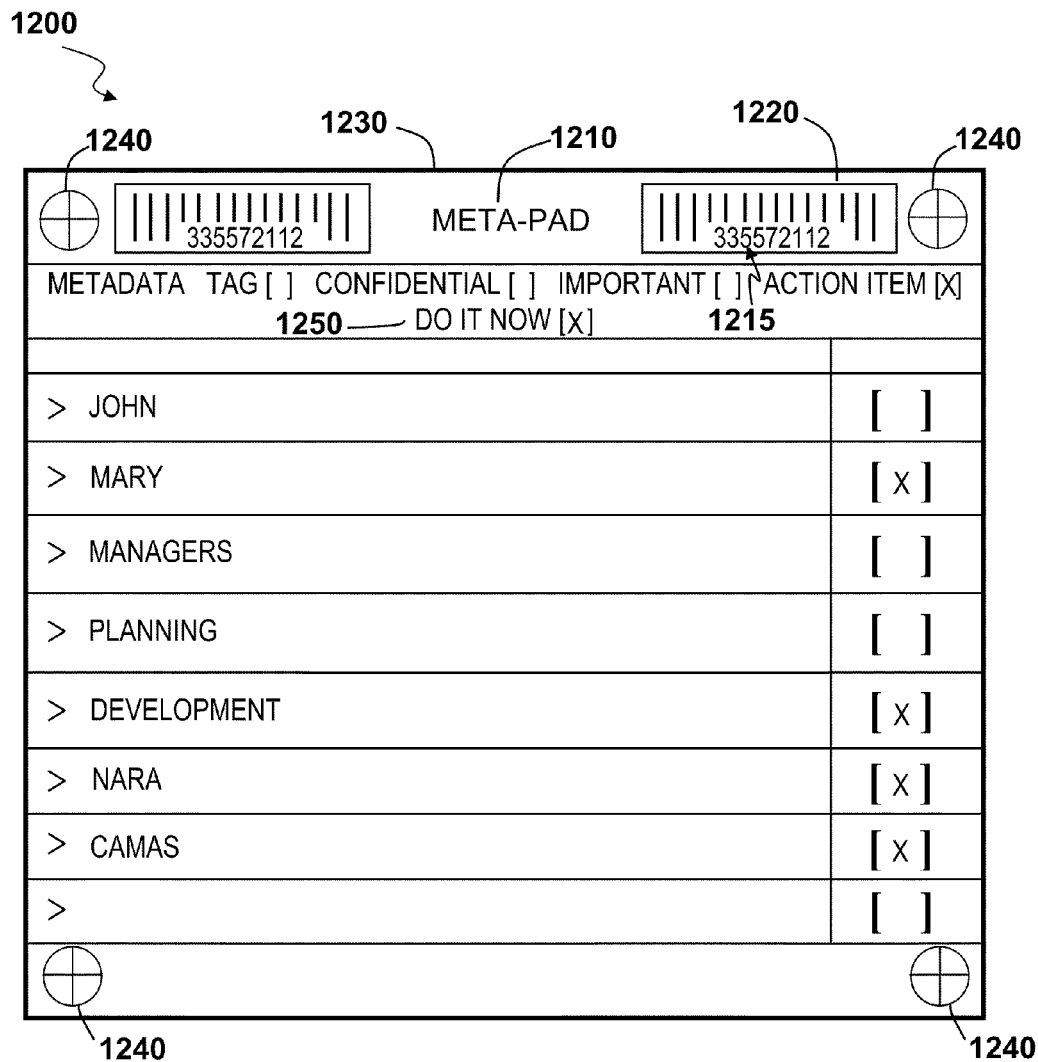
FIG. 12 depicts an exemplary embodiment of a surface indicia with the extracted markings on the sheet.

FIG. 12 depicts an exemplary embodiment of a surface indicia with the extracted markings on the sheet 1200. This exemplary sheet 1200 may also have one of at least a set of unique identifying symbols, e.g., one of at least a set of name 1210, identification number 1215, barcode 1220, or in some combination printed on it. The portion of the surface indicia containing the aforementioned objects may be readable by the computer-vision system that identifies the image reference associated with the sheet. The sheet may have a combination of identifying marks 1210, 1215, 1220, and/or boundary markings 1240 and/or heavy border lines 1230 to allow the computer-vision system to easily determine the orientation and boundaries of the image reference. This exemplary sheet contains the interpreted markings from the sheet 1100 in FIG. 11. In this embodiment, the "do it now" object 1250 has been marked signifying that the markings have been interpreted and the system is ready to process the markings once again. This particular exemplary sheet 1200 contains the menu options with the text interpreted by OCR processing and converted into binary text.

Figure 13:
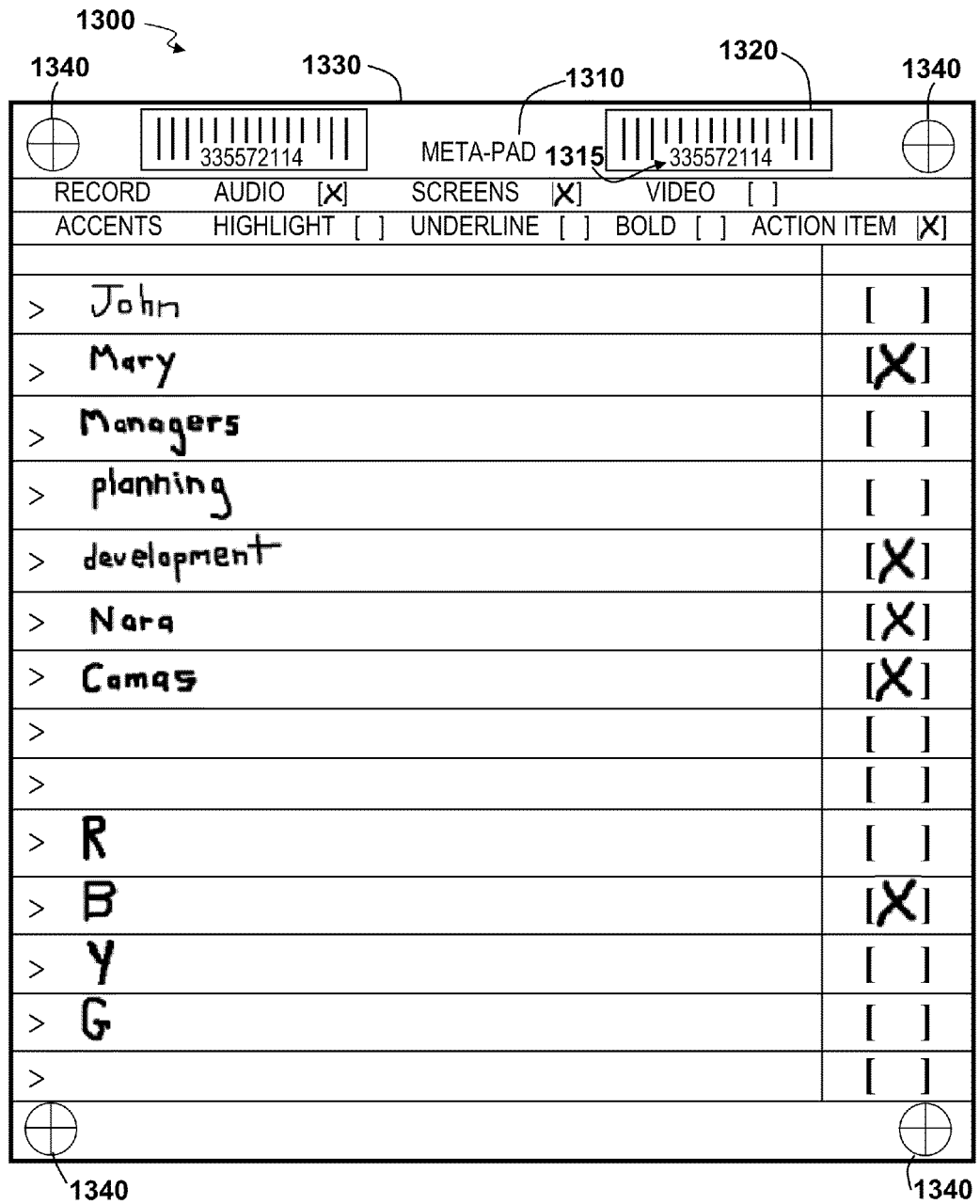
FIG. 13 depicts an exemplary embodiment of a surface indicia of a pre-printed sheet with markings.

FIG. 13 depicts an exemplary embodiment of a surface indicia of a pre-printed sheet 1300 with markings. This exemplary sheet 1300 may have a unique identifying symbol, e.g., any one of, name 1310, identification number 1315, barcode 1320, or in some combination printed on the sheet. The portion of the surface indicia containing the aforementioned objects may be readable by the computer-vision system, and used to identify the image reference associated with the sheet. The sheet may have a combination of identifying marks 1310, 1315, 1320, and/or boundary markings 1340 and/or heavy border lines 1330 to allow the computer-vision system to easily determine the orientation and boundaries of the image reference. This particular exemplary sheet contains menu options with the specialized purpose of assisting in creating and entering user defined meta-data or tags into the system. In an embodiment, the system may convert handwritten text to OCR with special software to convert the received meta-data to binary text. In this embodiment the system may receive data, e.g., color names to be identified and applied to electronic ink.

Figure 14:
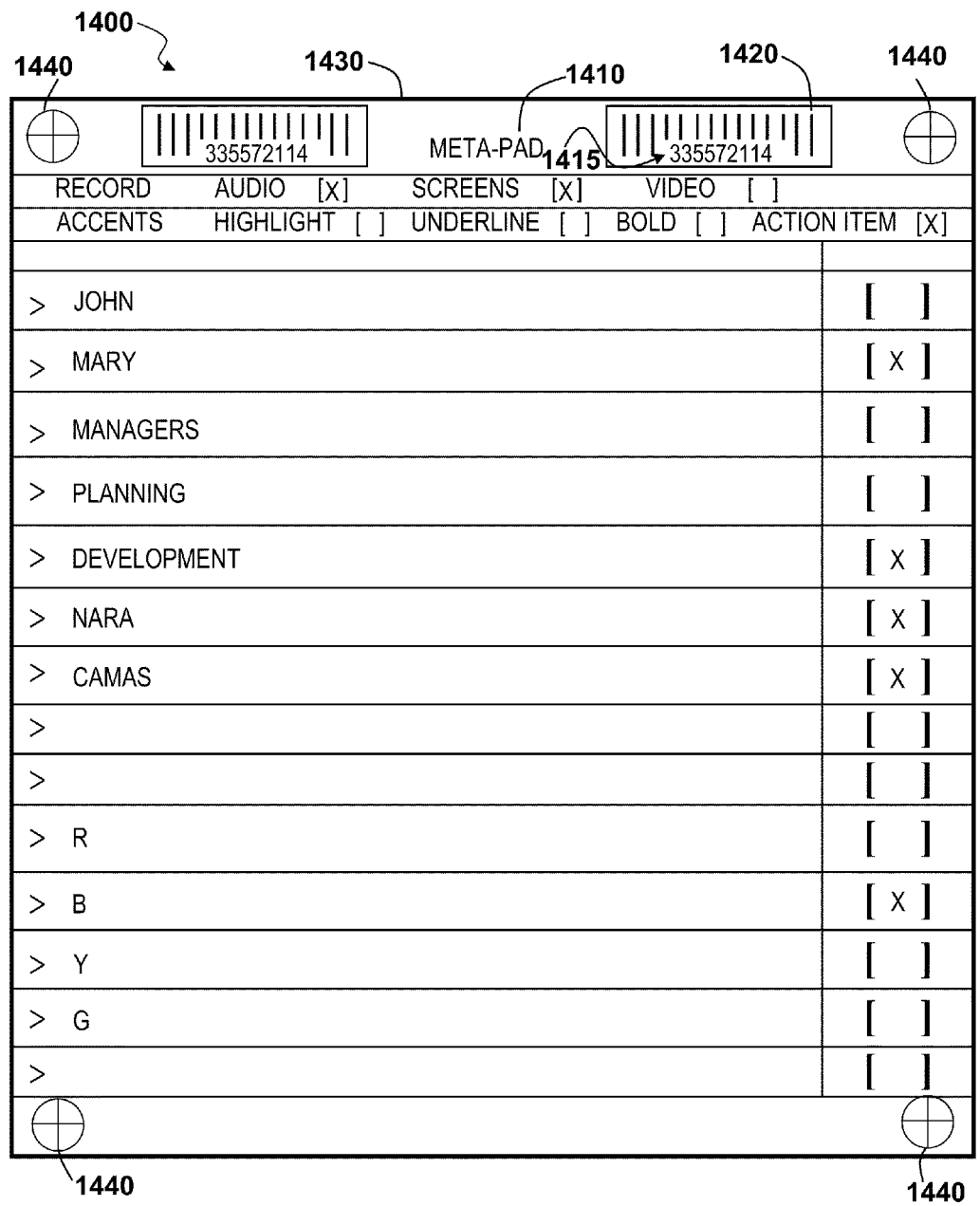
FIG. 14 depicts an exemplary embodiment of a surface indicia with the extracted markings on the sheet.

FIG. 14 depicts an exemplary embodiment of a surface indicia with the extracted markings on the sheet 1400. This exemplary sheet 1400 may have a unique identifying symbol, e.g., any one of, name 1410, identification number 1415, barcode 1420, or in some combination printed on the sheet. In this embodiment, the sheet may have a combination of identifying marks 1410, 1415, 1420, and/or boundary markings 1440 and/or heavy border lines 1430 to allow the computer-vision system to easily determine the orientation and boundaries of the image reference. This particular exemplary sheet contains the menu options along with the color names interpreted by OCR software and converted into binary text.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A device comprising:
    an image-based computer processor comprising:
        a processor;
        an addressable memory, the memory comprising a set of one or more image references, and wherein the set of image references comprises a rule of interpretation and a rule of execution; the processor configured to:
        compare captured surface indicia of a sheet with the set of one or more image references;
        determine the image reference associated with the surface indicia based on the comparison of the surface indicia and the set of one or more image references;
        extract a marking by differencing the surface indicia and the image reference;

interpret the extracted marking based on the rule of interpretation associated with the image reference; and invoke the rule of execution based on the rule of interpretation.

2. The device of claim 1 wherein the processor is further configured to receive data from at least one of a camera, video capturing device, digital video recorder, scanning camera, webcam, and motion capture device.

3. The device of claim 1 wherein the processor is further configured to compare the surface indicia with at least one image reference via a visual process.

4. The device of claim 1 wherein the processor is further configured to determine the image reference by using a detection method further comprising at least one of edge detection, geometric shape detection, and bar code detection.

5. The device of claim 1 wherein the processor is further configured to extract the markings via at least one of: visual differencing, pattern recognition, optical mark recognition, and optical character recognition.

6. The device of claim 1 wherein the processor is further configured to determine a marking on at least a portion of the surface indicia, indicative of immediate invocation of the rule of execution based on the rule of interpretation.

7. A method comprising:
capturing a surface indicia of a sheet;
comparing the surface indicia with a set of at least one image reference, wherein the image reference comprises a set of rules, and wherein each set of rules comprises a set of at least one rule of interpretation and a set of at least one rule of execution;
determining the image reference associated with the surface indicia based on the comparison of the captured surface indicia and the set of at least one image reference;
extracting a marking by differencing the surface indicia and the image reference;
interpreting the extracted marking based on the set of rules according to the image reference; and
invoking the rule of execution based on the rule of interpretation.

8. The method of claim 7 wherein if the interpretation of the extracted marking indicates an immediate invocation, the rule of execution based on the rule of interpretation is invoked immediately.

9. A system comprising:
a sheet element comprising surface indicia comprising:
a set of one or more predefined indicia; and
a surface configured to receive markings;
an image capture device, configured to:
capture an image of at least a portion of the sheet element;
an image-based computer processing device comprising:
a processor, and addressable memory, the memory comprising a set of one or more image reference, wherein each member of the set of image references comprises a rule of interpretation and a rule of execution; and
a processor configured to:
compare the captured surface indicia of the sheet with the set of one or more image references;
determine the image reference associated with the surface indicia based on the comparison of the surface indicia and the set of one or more image references;
extract a marking by differencing the surface indicia and the image reference;
interpret the extracted marking based on the rule of interpretation associated with the image reference; and
invoke the rule of execution based on the rule of interpretation.

10. The system of claim 9 wherein the sheet element is further comprised of flexible material.

11. The system of claim 9 wherein the sheet element is further comprised of electro-static material.

12. The system of claim 9 wherein the sheet element is further comprised of nontranslucent material.

13. The system of claim 9 wherein the system is further comprised of a plurality of image-based computer processing devices.

* * * * *